May 12, 1925. 1,537,642
W. J. LAFFEY
COMBINATION PNEUMATIC BRAKE AND PROPELLING MECHANISM
Filed May 5, 1924 2 Sheets-Sheet 1
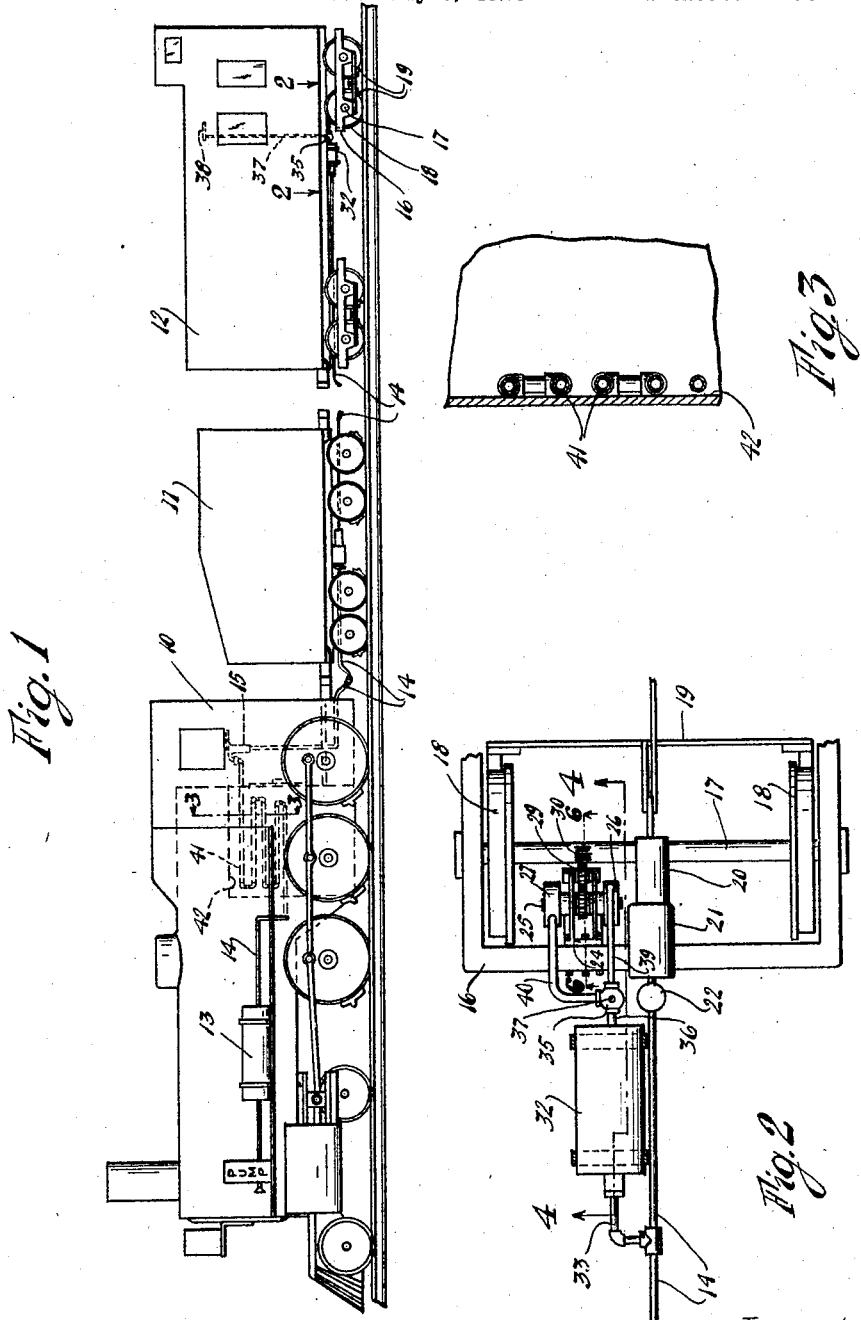
Inventor:
William J. Laffey May 12, 1925.  1,537,642
W. J. LAFFEY
COMBINATION PNEUMATIC BRAKE AND PROPELLING MECHANISM
Filed May 5, 1924   2 Sheets-Sheet 2

Witnesses:

Inventor:
William J. Laffey
By Joshua R. H. Potts
His Attorney.

Patented May 12, 1925.

1,537,642

UNITED STATES PATENT OFFICE.

WILLIAM J. LAFFEY, OF CHICAGO, ILLINOIS.

COMBINATION PNEUMATIC BRAKE AND PROPELLING MECHANISM.

Application filed May 5, 1924. Serial No. 711,280.

*To all whom it may concern:*

Be it known that I, WILLIAM J. LAFFEY, a citizen of the United States, and a resident of the city of Chicago, county of Cook, and State of Illinois, have invented certain new and useful Improvements in a Combination Pneumatic Brake and Propelling Mechanism, of which the following is a specification.

My invention relates to a combination pneumatic brake and propelling mechanism, and has for its object to provide such mechanism to operate individually on one or more of the railway vehicles of the train, which is auxiliary or supplemental to the usual brake and propelling means, for assisting in braking or retarding the movement of such vehicle and also for propelling or driving the same. Another object is to provide the mechanism with air driven means, preferably in the form of an air motor or turbine driven by the compressed air from the train pipe line for actuating the mechanical parts of said brake and propelling mechanism. And another object is to provide means for heating the compressed air flowing from the main reservoir through the train line, to increase its expansibility and pressure and thereby increase the effectiveness of my brake and propelling mechanism.

With the present tendency of constantly increasing the length of the railway trains and also increasing the speed of travel thereof, it is constantly necessary to provide larger and heavier locomotives in order to produce the required traction and adhesion between the locomotive drivers and the rails in order to start or to stop the train in a reasonably short time, and it is also well known that the rear vehicles of the train will crowd forward onto the preceding vehicles during the braking operation, and that during increase or decrease of speed the rearward vehicles will run with an unsteady motion, due to the slack in the draw bars, etc. It is my particular object to overcome these conditions and to provide auxiliary mechanism attachable to and operative on the individual vehicles, and particularly on the rearward vehicles of a train, to assist in braking such rearward vehicles and thus effectively retard the crowding thereof onto the preceding vehicles; and furthermore to construct my mechanism so that the same may also be used in moving or propelling the vehicle either forward or backward, as during the starting or during the backing of the train. And in addition with such mechanism the compressed air for the train line is heated and its expansive force increased in order to make my mechanism more effective.

Other objects and advantages will become apparent from the following description, taken in connection with the accompanying drawings forming part of the disclosure, and in which, Fig. 1 illustrates a train with my invention applied thereto;

Fig. 2 is an enlarged plan view taken on line 2—2 of Fig. 1;

Fig. 3 is an enlarged fragmentary view taken on line 3—3 of Fig. 1;

Figure 4:
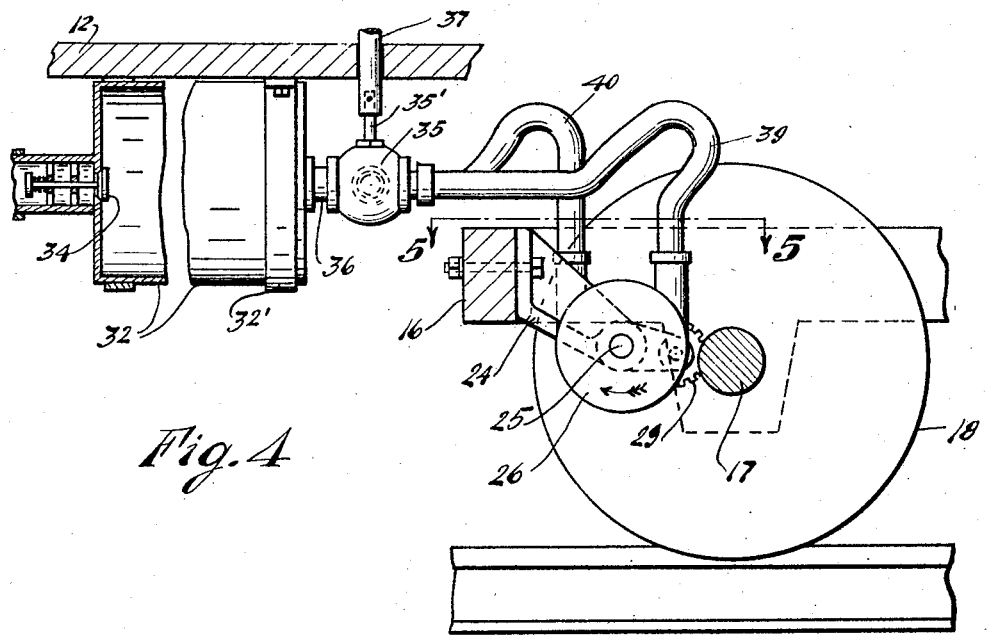
Fig. 4 is an enlarged vertical section taken on line 4—4 of Fig. 2.

In the drawings I have illustrated my invention in connection with a train including a locomotive 10, with its tender 11, and a railway vehicle 12, shown in the form of a caboose in Fig. 1. The locomotive 10 is provided with the usual main reservoir 13 and the train pipe line or air-brake line 14 leading therefrom and having the engineer's valve 15 interposed therein. The caboose is provided with the usual truck frame 16 and the rotary axles 17 and wheels 18 thereon, also the brake rigging 19 operated by the brake cylinder 20 connected with the auxiliary reservoir 21 and the triple valve 22, as best indicated in Fig. 2 of the drawings.

My improved mechanism for either retarding or for propelling the vehicle comprises a bracket 24 mounted on the truck frame 16 and supporting a shaft 25 on which are mounted a pair of air motors or turbines 26 and 27, which are operative in reversed directions for selectively rotating the gear wheel 28 in either direction; and an idler 29, mounted on a short shaft 29' in bracket 24, is driven by gear wheel 28 and engages gear means 30 on axle 17 of the vehicle. This gear means 30 is shown in the form of teeth cut directly on the axle, in order to make a particularly strong construction and prevent stripping of gear teeth, but said gear means 30 may also consist of other suitable means securely mounted on the axle. These turbines 26 and 27 have been indicated by way of illustration, but will be provided of the proper size, power and speed to properly operate on gear wheels 28 and 29 and gear means 30.

Figures 5, 6:
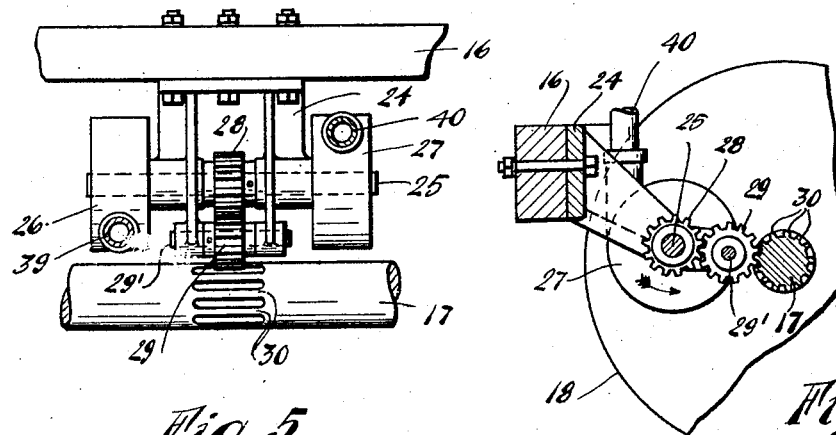
Fig. 5 is a horizontal section taken on line 5—5 of Fig. 4.
Fig. 6 is a vertical section taken on line 6—6 of Fig. 2.

The means for driving the turbines includes a reservoir or compressed air container 32 mounted with suitable supporting means 32' under the vehicle 12 and connected with a suitable conduit 33 with the train pipe line or air-brake line 14 for conveying compressed air from said pipe line through the check valve or one-way valve 34 into said reservoir. A three-way valve 35 is interposed in a conduit 36 leading from the reservoir, and is controlled by lever means 37 connected with the stem 35' of said valve and operated by a handle 38 located inside of the vehicle or caboose 12. A pliable conduit or hose 39 extends from one outlet of said valve to turbine 26 and a similar pliable conduit or hose 40 extends from the second outlet of said valve to the turbine 27. The valve operating handle 38 is operated to connect the conduit 36 through valve 35 with conduit 39 for actuating turbine 26 to rotate said turbine and the shaft 17 in the direction as indicated by the arrow in Fig. 4, or said handle 38 is turned in the reversed direction to connect conduit 36 with conduit 40 to actuate turbine 27 and rotate said turbine and the axle in the reversed direction as indicated by the arrow shown in Fig. 6.

I preferably also provide means for heating the air as it flows from the main reservoir 13 on the locomotive through the train pipe line 14; this means includes coils of pipe 41 mounted in the fire box 42 and interposed in pipe 14 between the main reservoir 13 and the engineer's valve 15.

It is apparent from the above disclosure that the air from the air-brake line 14 effects the movement of the mechanical part of the apparatus selectively in either direction and thereby acts on or modifies the rotational movement of a rotationable member of a train, like an axle; and consequently that this device not only acts to propel or move the axle and the wheels selectively in either direction, but also that when the device acts in a backward direction upon the axle and wheels that by this operation it has a braking effect and acts in stopping and retarding the vehicle, due to the fact that it turns the axle and wheels backward.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a train, the combination with the locomotive and its reservoir, a vehicle, and an air-brake line extending from said reservoir to said vehicle; of means mounted on said vehicle and actuated by the air from said air-brake line for operating on a rotatable member of said vehicle selectively in reversed directions to modify the movement of said vehicle; and means interposed in said brake line and mounted in said locomotive for heating the air while passing from said reservoir to said means on the vehicle.

2. In a train, the combination with the locomotive and its reservoir and fire box, a vehicle, and an air-brake line extending from said reservoir to said vehicle; of means mounted on said vehicle to operate on the axle thereof; air driven means actuated by the air from said brake line for driving the first said means to operate on said axle for propelling said vehicle either forward or backward; and means interposed in said brake line and mounted in said fire box for heating the air passing from said reservoir to said air driven means on the vehicle.

3. The combination, with a vehicle and the air-brake line thereon; of mechanical means engaging a rotatable supporting member of said vehicle for modifying the rotational movement of said member; and turbine means driven by the air from said brake line for operating said mechanical means and said rotatable member selectively in reverse directions.

4. The combination, with a railway vehicle and the air-brake line thereon; of mechanical means engaging a rotatable member of said vehicle for moving the same in either direction; an air container for storing compressed air from said brake line; and valve controlled air driven means connected to said container for actuating said mechanical means and said member selectively in reversed directions.

5. The combination, with a railway vehicle and the air-brake line thereon; of a reservoir for containing air from said brake line; means for acting on an axle of said vehicle; a pair of turbines for driving said means selectively in reversed directions; and valve controlled conduit means connecting said turbines with said reservoir.

6. The combination, with a railway vehicle and the air-brake line thereon; of gear means on an axle of said vehicle; and turbine means driven by the air from said brake line and provided with means for driving said gear means and axle selectively in either direction.

7. The combination, with a railway vehicle and the air-brake line thereon; of a reservoir with a check valve for storing air from said brake line; gear teeth on the axle of said vehicle; gear means for driving said axle; and a pair of turbines connected with valve controlled means to said reservoir for selectively driving said axle in opposite directions.

In testimony whereof I have signed my name to this specification in the presence of two subscribing witnesses.

WILLIAM J. LAFFEY.

Witnesses:
　FREDA C. APPLETON,
　JOSHUA R. H. POTTS.